United States Patent [19]

Hoshi

[11] Patent Number: 4,843,605
[45] Date of Patent: Jun. 27, 1989

[54] NODE APPARATUS FOR COMMUNICATION NETWORK HAVING MULTI-CONJUNCTION ARCHITECTURE

[75] Inventor: Kazunori Hoshi, Yokohama, Japan

[73] Assignee: Ricoh Company, Ltd., Tokyo, Japan

[21] Appl. No.: 171,798

[22] Filed: Mar. 22, 1988

[30] Foreign Application Priority Data

Mar. 26, 1987 [JP] Japan .................................. 62-70284

[51] Int. Cl.⁴ ............................................. H04J 3/24
[52] U.S. Cl. ........................................ 370/60; 370/94
[58] Field of Search ........................... 370/94, 60, 58; 340/825.52, 825.79, 825.83; 455/607; 178/3

[56] References Cited

U.S. PATENT DOCUMENTS

| | | |
|---|---|---|
| 4,276,643 | 6/1981 | Laprie et al. . |
| 4,380,063 | 4/1983 | Janson et al. ........................ 370/60 |
| 4,393,381 | 7/1983 | Seiden ............................ 340/825.83 |
| 4,399,531 | 8/1983 | Grande et al. ....................... 370/60 |
| 4,443,875 | 4/1984 | Blausten ............................. 370/94 |
| 4,470,154 | 9/1984 | Yano . |
| 4,482,996 | 11/1984 | Wilson et al. ....................... 370/60 |
| 4,516,272 | 5/1985 | Yano . |
| 4,602,364 | 7/1986 | Herman et al. ...................... 370/60 |

OTHER PUBLICATIONS

"A Local Network Design Using Fiber Optics", IEEE 1981, Randall Neff & Don, Senzig.

Primary Examiner—Douglas W. Olms
Assistant Examiner—Min Jung Kim
Attorney, Agent, or Firm—Oblon, Fisher, Spivak, McClelland & Maier

[57] ABSTRACT

A node apparatus is used in a communication network having a multi-conjunction architecture. The communication network has a plurality of transmission paths each coupling one node apparatus to another node apparatus or a terminal device. The node apparatus generally comprises an input port, an output port, and a control part for controlling the coupling of input channels of the input port to output channels of the output port. The control part disconnects and releases a fixed communication path when a certain logic state of a signal continues for a predetermined time period after the communication path is fixed. This predetermined time period is variable and is determined depending on a characteristic of the signal to suit a protocol of the communication.

7 Claims, 13 Drawing Sheets

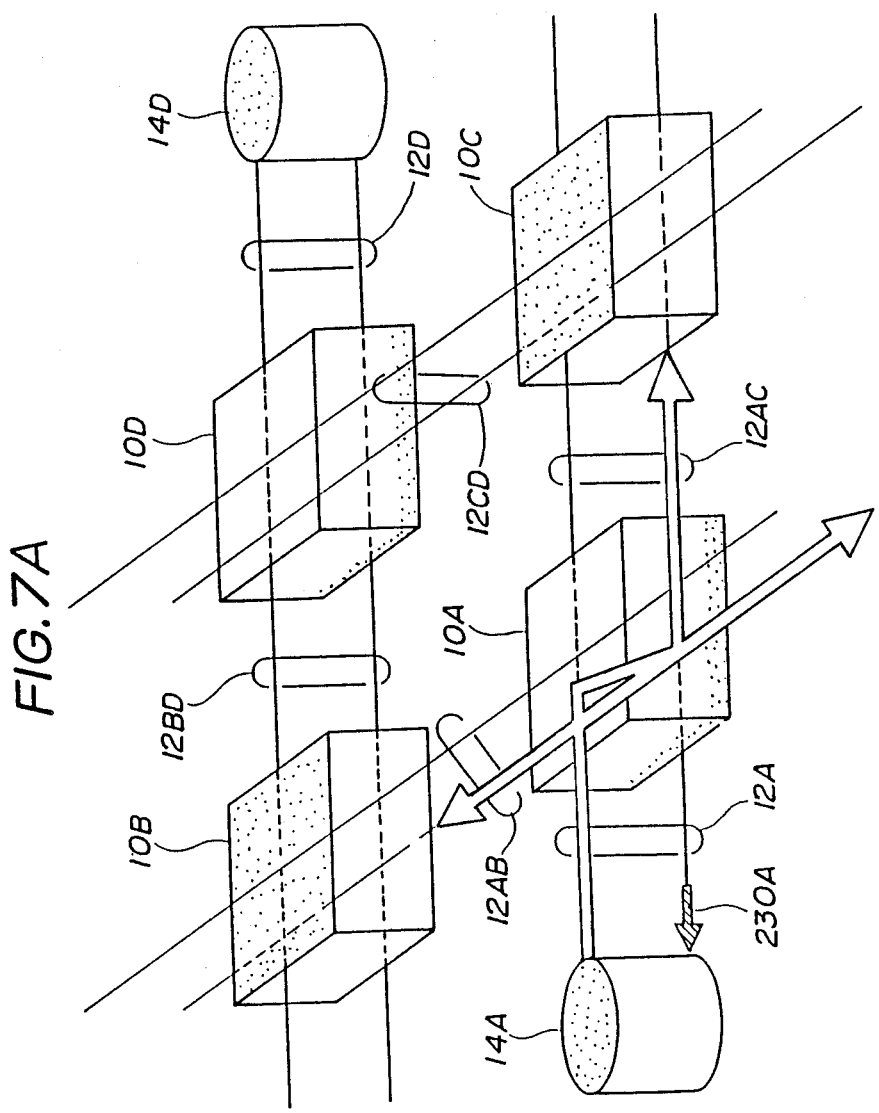

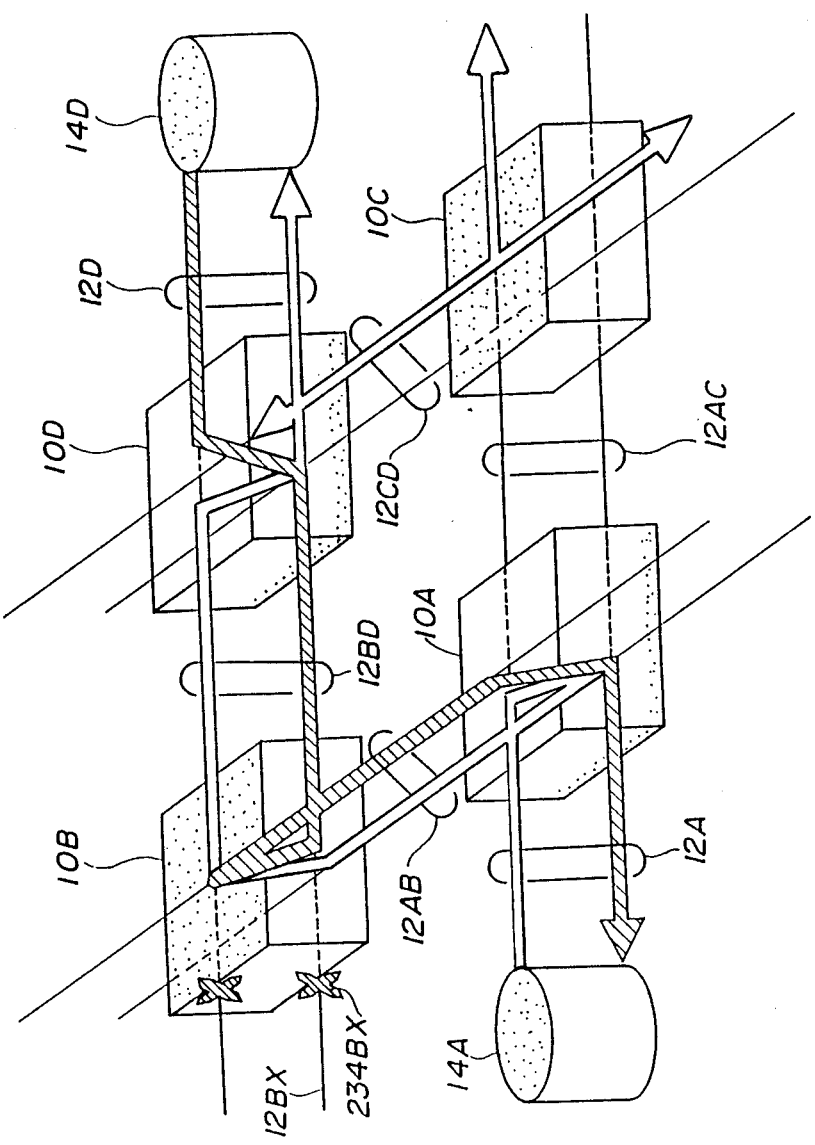

NODE APPARATUS FOR COMMUNICATION NETWORK HAVING MULTI-CONJUNCTION ARCHITECTURE

BACKGROUND OF THE INVENTION

The present invention generally relates to node apparatuses, and more particularly to a node apparatus of a communication network employing a multi-conjunction architecture.

A multi-channel lattice communication network applicable to local area networks (LANs), public line networks and especially to a multi-media communication was previously proposed in a U.S. patent application Ser. No. 096,532 filed Sept. 15, 1987 in which the assignee is the same as the assignee of the present application. The proposed lattice communication network is analogous to nerve cells of a living body, and employs node apparatuses. Each node apparatus has a plurality of input and output channels and is used as a communication control element. Such node apparatuses are coupled in a multi-conjunction to constitute the lattice communication network. Each node apparatus transfers one of incoming digital signals according to a first-come-first-served logic (hereinafter simply referred to as a first-come-first-output logic).

The proposed lattice communication network has a large degree of freedom of network topology because of the multi-conjunction architecture. Thus, the survivability of data is high. In other words, even when a fault occurs in a path of the communication network, it is possible to carry out the communication through other paths. Furthermore, it is possible to select optimum paths for the communication because each node apparatus transfers the incoming digital signals according to the first-come-first-output logic.

On the other hand, the proposed lattice communication network employs a multi-channel system in which a plurality of connecting channels are established, so as to effectively achieve a full duplex communication. The proposed lattice communication network is effectively applicable to the physical layer to the network layer of the open system interconnection (OSI), for example.

When making a communication in the proposed lattice communication network, a node apparatus which receives a signal broadcasts the signal to other node apparatuses or terminal devices and waits for an acknowledge signal or returning signal sent back from a destination terminal device. A communication path is fixed when the acknowledge signal is received from the destination terminal device. The fixed communication path is supervised by each node apparatus included in the fixed communication path. Each node apparatus constantly supervises the signal level at input and output channels thereof, and detects an end of the communication when a low level continues for a predetermined supervision time. The node apparatus enters an end sequence when the end of the communication is detected.

Generally, the node apparatus is used in common for communications of different protocols. A supervision time based on which the end of the communication is detected is generally different for each protocol. However, in the proposed node apparatus, the supervision time for use in detecting the end of the communication is fixed. For this reason, in order to enable communications of different protocols to be made through the one node apparatus, the supervision time of the node apparatus for use in detecting the end of the communication must be set in accordance with the protocol which requires the longest supervision time. In this case, unless the supervision time is set to the longest supervision time, there is a danger in that a low-level information signal in the communication path may be erroneously detected as an end of the communication and result in an erroneous disconnection of the communication path while a communication is actually being made.

However, when the supervision time of the node apparatus is set to the longest supervision time, it takes this longest supervision time to detect an end of a communication of a certain protocol which may actually be detected within a shorter time. In this case, the releasing of the fixed communication path is unnecessarily prolonged. Furthermore, the traffic of the communication network as a whole is unnecessarily limited.

SUMMARY OF THE INVENTION

Accordingly, it is a general object of the present invention to provide a novel and useful node apparatus in which the problems described heretofore are eliminated.

Another and more specific object of the present invention is to provide a node apparatus for a communication network having a multi-conjunction architecture, where the communication network has a plurality of transmission paths each coupling one node apparatus to another node apparatus or a terminal device. The node apparatus comprises an input port comprising a plurality of input channels connected to the transmission paths, an output port comprising a plurality of output channels connected to the transmission paths, a switching gate part for coupling the input and output channels of the input and output ports, and control means comprising first and second control parts for controlling the switching gate part to selectively couple the input and output channels, where the first control part is coupled to the input port and detects a first receiving input channel which receives a sending signal first out of the input channels, and the second control part is coupled to the input and output ports and controls the switching gate part based on a time supervision of a signal presence at the input and output channels of the input and output ports. The first control part controls the switching gate part responsive to the detection of the first receiving input channel so that all of the input channels other than the first receiving input channel are disconnected from the output channels, thereby transferring the sending signal received by the first receiving input channel to all of the output channels other than an output channel having a channel number corresponding to that of the first receiving input channel. The first control part detects a predetermined input channel which receives a returning signal out of the input channels other than the first receiving input channel, and also controls the switching gate part responsive to the detection of the predetermined input channel so that the predetermined input channel is connected to the output channel having a channel number corresponding to that of the first receiving input channel and the first receiving input channel is connected to an output channel number corresponding to that of the predetermined input channel, thereby fixing a communication path between the input and output ports. The second control part controls the switching gate part to disconnect and release the fixed communication path when a certain logic state of the signal continues at the input and output channels of the input and output ports for a predetermined time period after the communication path is fixed, where the predetermined time period is variable. The second control part has a circuit part for determining the predetermined time period depending on a characteristic of the sending signal for at least one of the first receiving input channel and the corresponding output channel.

According to the node apparatus of the present invention, the predetermined time period is variable for each channel depending on the kind of protocol of the communication. Hence, even when communications of different protocols, that is, different signal transmission rates, coexist in the communication network, it is possible to finely control with an appropriate timing the predetermined time period (supervision time) for detecting the end of the communication, to improve the efficiency of the communication network as a whole.

Other objects and further features of the present invention will be apparent from the following detailed description when read in conjunction with the accompanying drawings.

BRIEF DESCRIPTION OF THE DRAWINGS

FIGS. 7A through 7E are diagrams for explaining the sequence of the communication made in the lattice communication network using four node apparatuses of the present invention;

DETAILED DESCRIPTION

Figure 1:
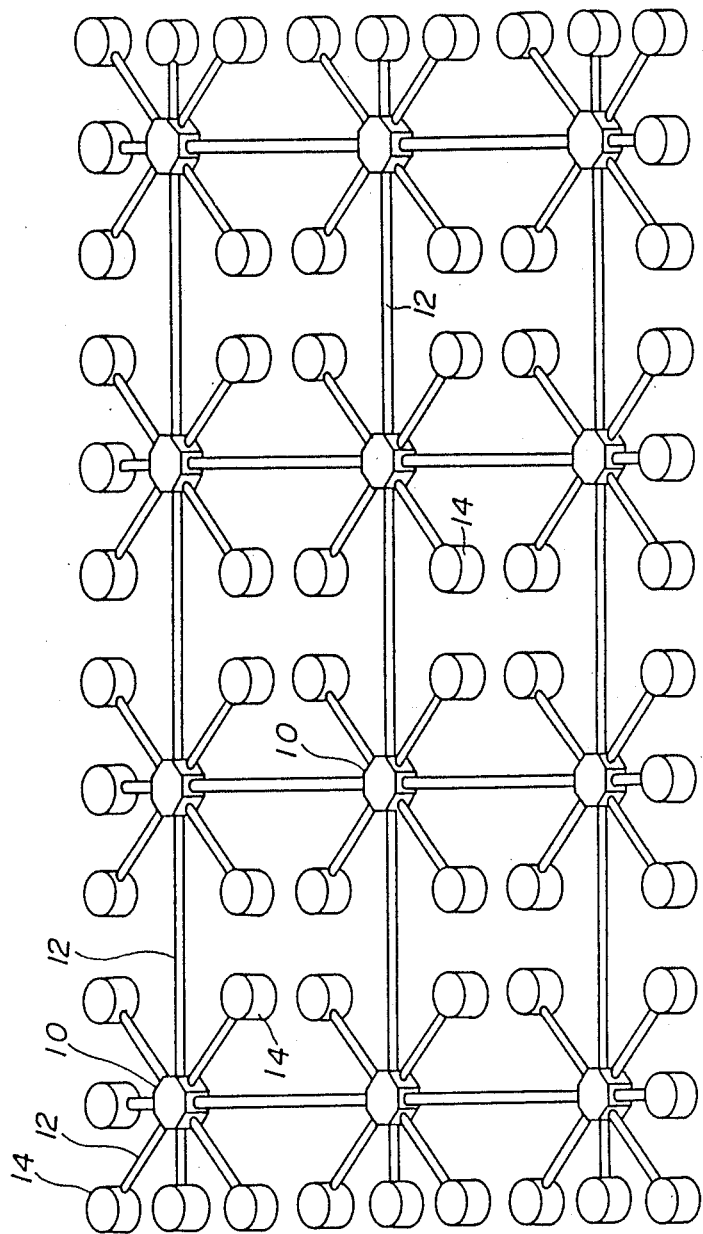
FIG. 1 shows a communication network employing the multi-conjunction architecture to which the node apparatuses according to the present invention may be applied.

First, a description will be given on a communication network employing the multi-conjunction architecture to which the node apparatus according to the present invention may be applied, by referring to FIG. 1. In FIG. 1, each node apparatus 10 is coupled to other node apparatuses 10 and/or terminal devices 14 through a transmission path 12 in two or three dimensions to constitute a lattice communication network. The communication network employing the multi-conjunction architecture may be a linear communication network or a loop shaped communication network.

There is no limit to the number of input and output channels of the node apparatus 10. Hence, there is no limit to the number of node apparatuses 10 and/or terminal devices 14 which may be coupled to the node apparatus 10 through the transmission path 12, provided that the number is within the capacity of input and output ports of the node apparatus 10. It is possible to constitute the entire communication network by a single node apparatus 10. In addition, it is possible to provide a plurality of node apparatuses 10 on a single printed wiring board and treat the wiring board as a single node apparatus, so as to essentially increase the capacity of the input and output ports.

The terminal device 14 can receive and transmit data asynchronously. For example, the terminal device 14 is a processing system such as a personal computer, a service station such as a filing station and a print station, and the like. It is desirable although not essential, that the data is transmitted in the form of message packets. As will be described later, it is desirable although not essential, that the terminal device 14 is designed for the full duplex communication and sends out a returning signal immediately after receipt of a sending signal (message packet) intended for the terminal device 14.

For example, the transmission path 12 is an optical transmission path constituted by optic fibers or an electrical transmission path constituted by twisted pair wire, coaxial cable and the like. In the present embodiment, the data is transmitted in analog or digital form, and the full duplex communication is carried out in the communication network. The transmission path 12 between the node apparatus 10 and the terminal device 14 may be designed for the half duplex communication. It is possible to provide a plurality of transmission paths 12 between the node apparatuses 10 depending on the traffic.

Figure 2:
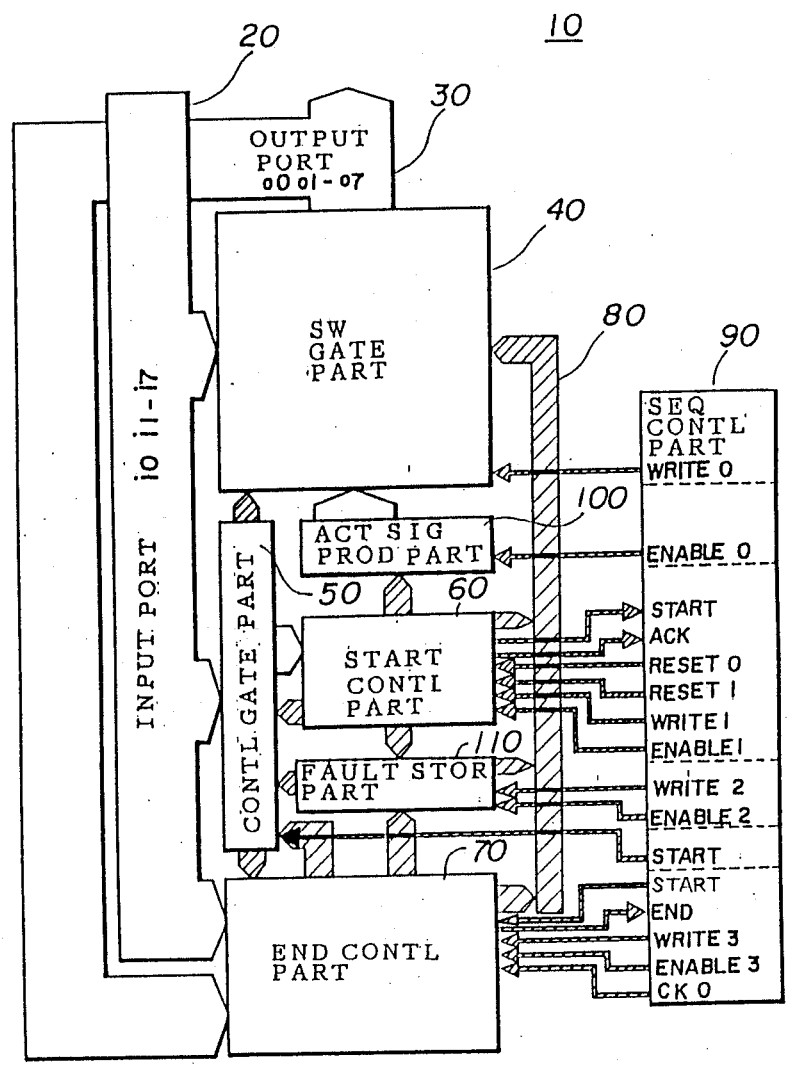
FIG. 2 is a system block diagram showing an embodiment of the node apparatus according to the present invention.

FIG. 2 shows an embodiment of the node apparatus 10 according to the present invention. The node apparatus 10 generally comprises an input port 20, an output port 30, a switching gate part 40, a control gate part 50, a start control part 60, an end control part 70, a gate setting bus 80, a sequence control part 90, an active signal producing part 100 and a fault storage part 110.

The input port 20 is connected to receiving lines of the transmission path 12, while the output port 30 is connected to sending lines of the transmission path 12. The input port 20 is coupled to the output port 30 through the switching gate part 40. In the present embodiment, the input port 20 comprises eight receiving or input channels i0 through i7, and the output port 30 comprises eight sending or output channels o0 through o7. Hence, in the present embodiment, it is possible to connect up to eight node apparatuses 10 and/or terminal devices 14 to one node apparatus 10 through the transmission path 12. A pair of input channel and output channel having a corresponding channel number is coupled to another node apparatus 10 (or terminal device 14).

The switching gate part 40 selectively couples an arbitrary one of the input channels i0 through i7 to arbitrary ones of the output channels o0 through o7. The input port 20 is coupled to the start control part 60 and the end detecting part 70 through the control gate part 50.

The control gate part 50 controls the supply of signals from the input port 20 to the start control part 60 and the supply of control signals from the start control part 60, the fault storage part 110 and the end control part 70 to the appropriate one of the switching gate part 40, the start control part 60 and the end control part 70.

The start control part 60 detects whether or not an input signal is received by the input port 20 and discriminates a first receiving input channel which receives the input signal first. The end control part 70 detects an end of the input signal received by the input channel connected to a set communication path, and carries out a communication ending process. The switching gate port 40, the start control part 60 and the end control part 70 are coupled to each other through the gate setting bus 80.

The active signal producing part 100 for producing an active signal is coupled to the switching gate part 40 and the start control part 60. The fault storage part 110 for storing data on a faulty or dormant input channel is coupled to the start control part 60, the end control part 70 and the gate setting bus 80.

The switching gate part 40, the control gate part 50, the start control part 60, the end control part 70, the active signal producing part 100 and the fault storage part 110 are respectively controlled by the sequence control part 90.

The active signal producing part 100 produces an active signal indicating that the node apparatus 10 is operating normally and is active. The active signal has no restriction except for the signal length thereof. The signal length of the active signal is set to a value which is longer than a minimum time required to operate flip-flops of the start control part 60 and terminates within the length of an active detection time constant.

The start control part 60 generally comprises a first input signal detecting part (not shown) and an input signal detecting part (not shown). The first input signal detecting part detects the input signals from the input channels i0 through i7 and discriminates which input signal is received first, that is, which input channel receives the input signal first, according to the first-come-first-output logic. The input signal detecting part detects whether or not an input signal is received by the input port 20. The first input signal detecting part and the input signal detecting part each comprise a group of flip-flops and a group of gates provided in correspondence with the number of input channels.

The fault storage part 110 is used to store one or more faulty or dormant input channels.

The switching gate part 40, the control gate part 50, the start control part 60, the active signal producing part 100 and the fault storage part 110 are further disclosed in the U.S. patent application Ser. No. 096,532, the disclosure of which is hereby incorporated by reference.

Figure 3:
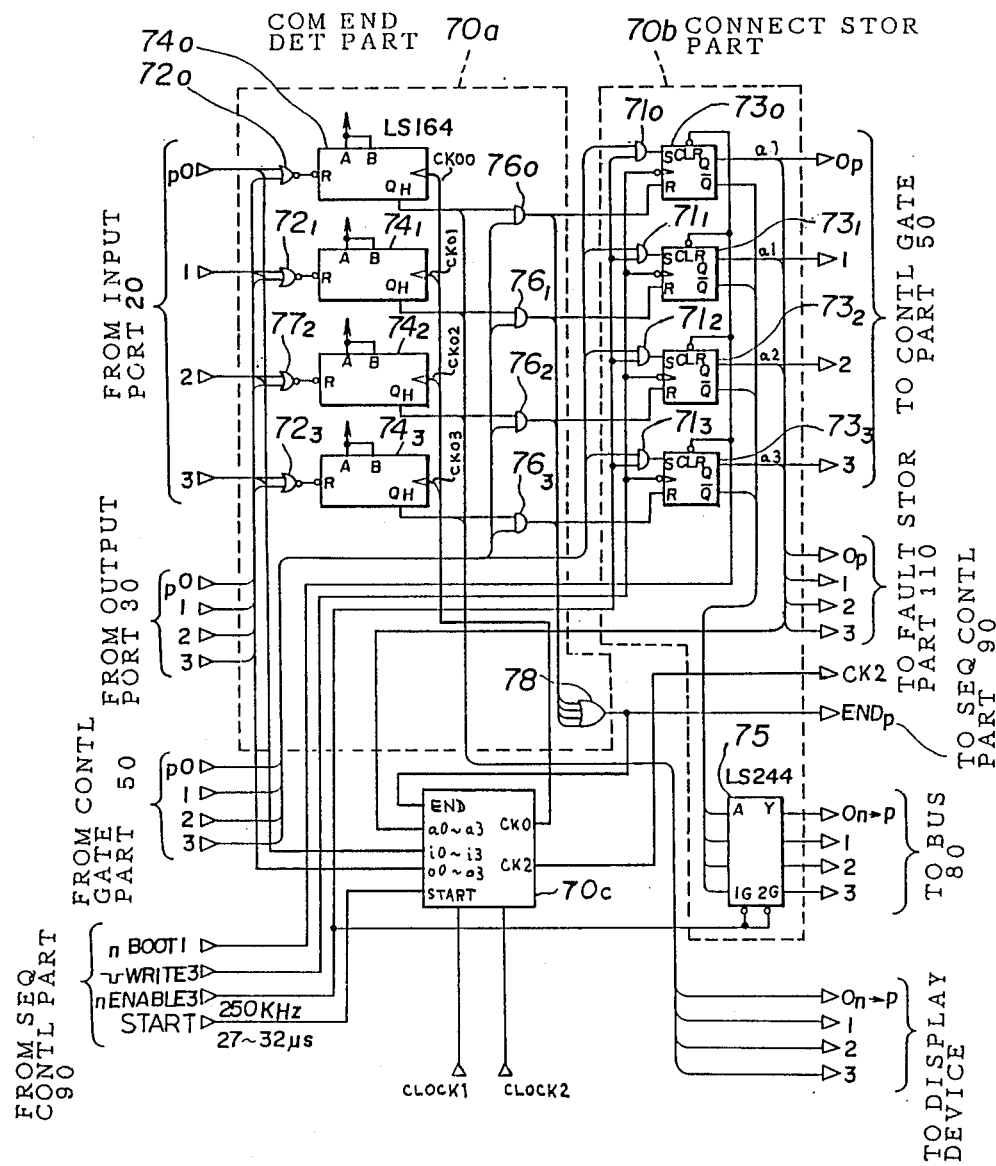
FIG. 3 is a circuit diagram showing an embodiment of an end control part of the node apparatus shown in FIG. 2.

FIG. 3 shows an embodiment of the end control part 70 for four input and output channels. The end control part 70 generally comprises a communication end detecting part 70a, a connection storage part 70b and a clock setting circuit 70c. The communication end detecting part 70a comprises four 2-input NOR gates $72_0$ through $72_3$, four shift registers $74_0$ through $74_3$, four 2-input AND gates $76_0$ through $76_3$, and a 4-input OR gate 78 which are connected as shown.

Each of the NOR gates $72_0$ through $72_3$ receive signals of a corresponding channel from the input port 20 and the output port 30. The outputs of the NOR gates $72_0$ through $72_3$ are supplied to reset terminals R of the corresponding shift registers $74_0$ through $74_3$. The shift registers $74_0$ through $74_3$ detect the end of the communication based on the communication end detection time constant as will be described later. Clock signals CK0 (CK00 through CK03) from the clock setting circuit 70c are supplied to corresponding clock terminals of the shift registers $74_0$ through $74_3$. Each of the AND gates $76_0$ through $76_3$ receive a signal of a corresponding channel from the control gate part 50 and the $Q_H$-output of the corresponding one of the shift registers $74_0$ through $74_3$. The OR gate 78 obtains a logical sum of the outputs of the AND gates $76_0$ through $76_3$ and reports to the sequence control part 90 through a terminal END that the communication is ended in the fixed communication path or that the sending signal received by the first receiving input channel is interrupted. The control gate part 50 controls the AND gates $76_0$ through $76_3$ to determine whether the OR gate 78 is to report the end of the communication or the interruption of the sending signal. As may be readily understood from FIG. 3, the end control part 70 discriminates that the communication is ended when signals no longer exist in both the two input channels included in the fixed communication path which is used for the communication.

The end of the communication is detected when no signal is obtained and a predetermined logic value of the signal continues for a time defined by the communication end detection time constant. The communication end detection time constant is provided to detect that no signal continues after the sending signal (or returning signal) and the communication is ended. The length of the communication end detection time constant is set to a time which is required to discriminate the true end of the communication from consecutive "0"s or "1"s in the case of the full duplex communication, and normally, a slight margin time is added to the length of the communication end detection time constant. In other words, the length of the communication end detection time constant is one bit in the case of the Manchester encoding, and is seven or more bits in the case of the encoding in which "0" is inserted into six consecutive "1"s in NRZI, for example. Normally, the length of the communication end detection time constant is made two times longer to add the slight margin time, that is, to two or fourteen or more bits. This communication end detection time constant is the same as the input signal detection time constant.

When enabling both the full duplex communication and the half duplex communication, the length of the communication end detection time constant is set to a time which is essentially equal to a sum of a propagation delay time for a return trip covering the maximum tolerable distance between the node apparatus 10 and another node apparatus 10 or the terminal device 14 and a time it takes for the terminal device 14 to send a returning (or sending) signal after the receipt of a sending (or returning) signal ends. In this case, the communication end detection time constant is the same as a terminal response supervision time. Normally, a slight margin time is added to this length of the communication end detection time constant.

The connection storage part 70b comprises four 2-input AND gates $71_0$ through $71_3$, four SR flip-flops $73_0$ through $73_3$, and a bus buffer 75 which are connected as shown in FIG. 3. Each of the AND gates $71_0$ through $71_3$ receive a signal from a terminal ENABLE3 of the sequence control part 90 shown in FIG. 4 which will be described later and a signal of the corresponding channel from the control gate part 50. The outputs of the AND gates $71_0$ through $71_3$ are supplied to set terminals S of the corresponding flip-flops $73_0$ through $73_3$, and the outputs of the AND gates $76_0$ through $76_3$ within the communication end detecting part 70a are supplied to reset terminals R of the corresponding flip-flops $73_0$ through $73_3$. In addition, a signal from a terminal WRITE3 of the sequence control part 90 is supplied to clock terminals of the flip-flops $73_0$ through $73_3$. The Q-outputs of the flip-flops $73_0$ through $73_3$ are supplied to the control gate part 50 and the fault storage part 110, while the $\overline{Q}$-outputs of the flip-flops $73_0$ through $73_3$ are supplied to the bus buffer 75.

The flip-flops $73_0$ through $73_3$ store data indicative of the channels in the communication path which is fixed, and the AND gates $71_0$ through $71_3$ control the write-in and erasure of the data in the flip-flops $73_0$ through $73_3$. The bus buffer 75 controls the connection of the outputs of the flip-flops $73_0$ through $73_3$ to the gate setting bus 80.

A description on the clock setting circuit 70c will be given later.

Accordingly, in the end control part 70 shown in FIG. 3, the shift registers $74_0$ through $74_3$ can constantly detect the end of the communication in all of the channels. In other words, it is possible to detect the end of the communication in a channel which is not selected by the control gate part 50. For this reason, there is no delay corresponding to the communication end detection time constant when detecting the end of the communication immediately after the selected channel is changed.

The communication end detection time constant simply needs to be set appropriately for the case where the full duplex communication is chosen and the case where both the full duplex communication and the half duplex communication are to be enabled. Accordingly, there is no need to modify the hardware of the end control part 70 itself.

In FIG. 3, it is possible to use four 2-input NAND gates in place of the NOR gates $72_0$ through $72_3$. In this case, the end control part 70 discriminates that the communication is ended when a signal no longer exists in one of the input and output channels included in the fixed communication path which is used for the communication.

Figure 4:
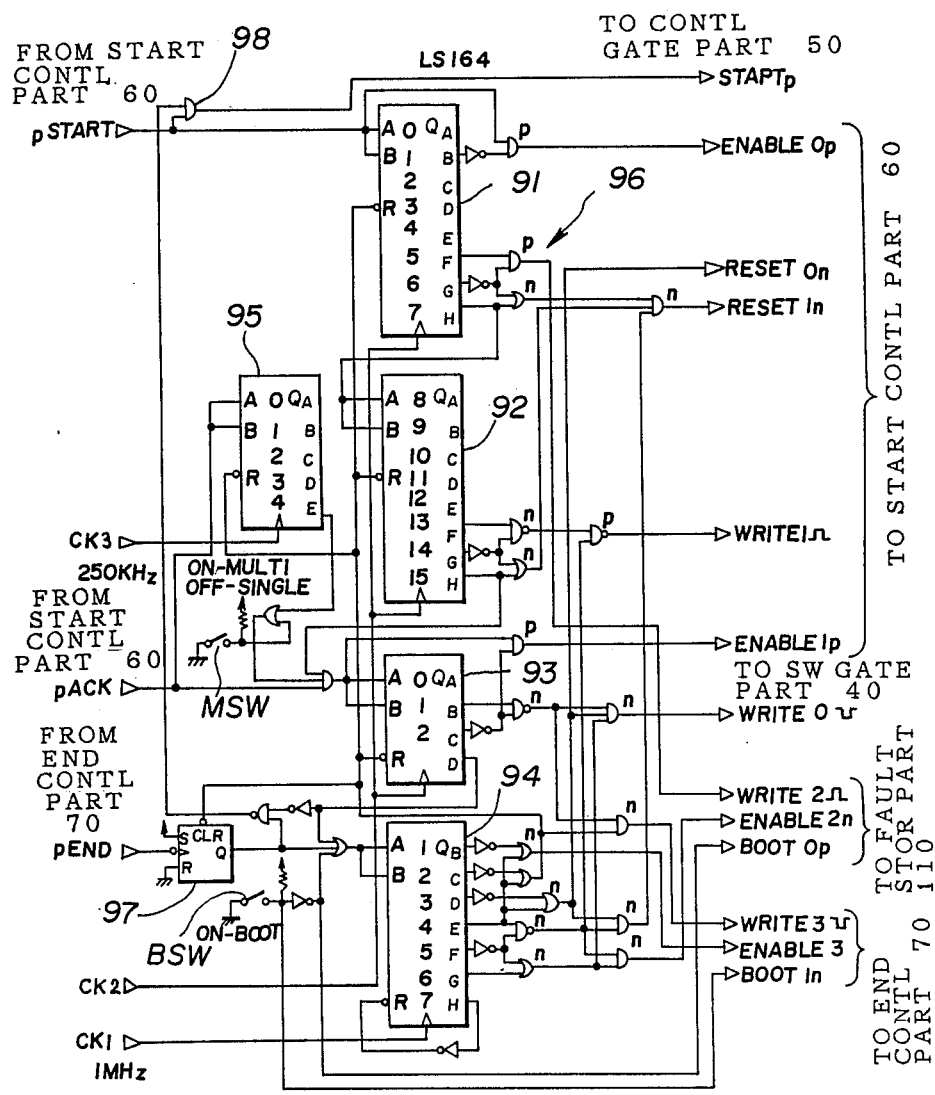
FIG. 4 is a circuit diagram showing an embodiment of a sequence control part of the node apparatus shown in FIG. 2.

FIG. 4 shows an embodiment of the sequence control part 90 for four input and output channels. The sequence control part 90 comprises five shift registers 91 through 95, a gate group 96 comprising gates for producing necessary control signals from outputs of the shift registers 91 through 95, a flip-flop 97, a 2-input AND gate 98, a mode changing switch MSW, and a boot switch BSW which are connected as shown.

When there is a contention between the start of the communication and the end of the communication, the flip-flop 97 and the AND gate 98 assign the priority to the end of the communication. A system clock signal CK3 is supplied to a clock terminal of the shift register 95, a system clock signal CK1 is supplied to a clock terminal of the shift register 94, and a system clock signal CK2 is supplied to clock terminals of the shift registers 91 through 93. In the present embodiment, the shift register 95 is not used, and further, the mode changing switch MSW is constantly open. The boot switch BSW is manipulated only when initially starting the node apparatus 10, and is used to initially set all of the flip-flops within the node apparatus 10. The active detection time constant and the input signal detection time constant are determined in the sequence control part 90. There is no need to modify the hardware of the sequence control part 90 itself between the case where the full duplex communication is chosen and the case where both the half duplex communication and the full duplex communication are to be enabled.

Figure 5:
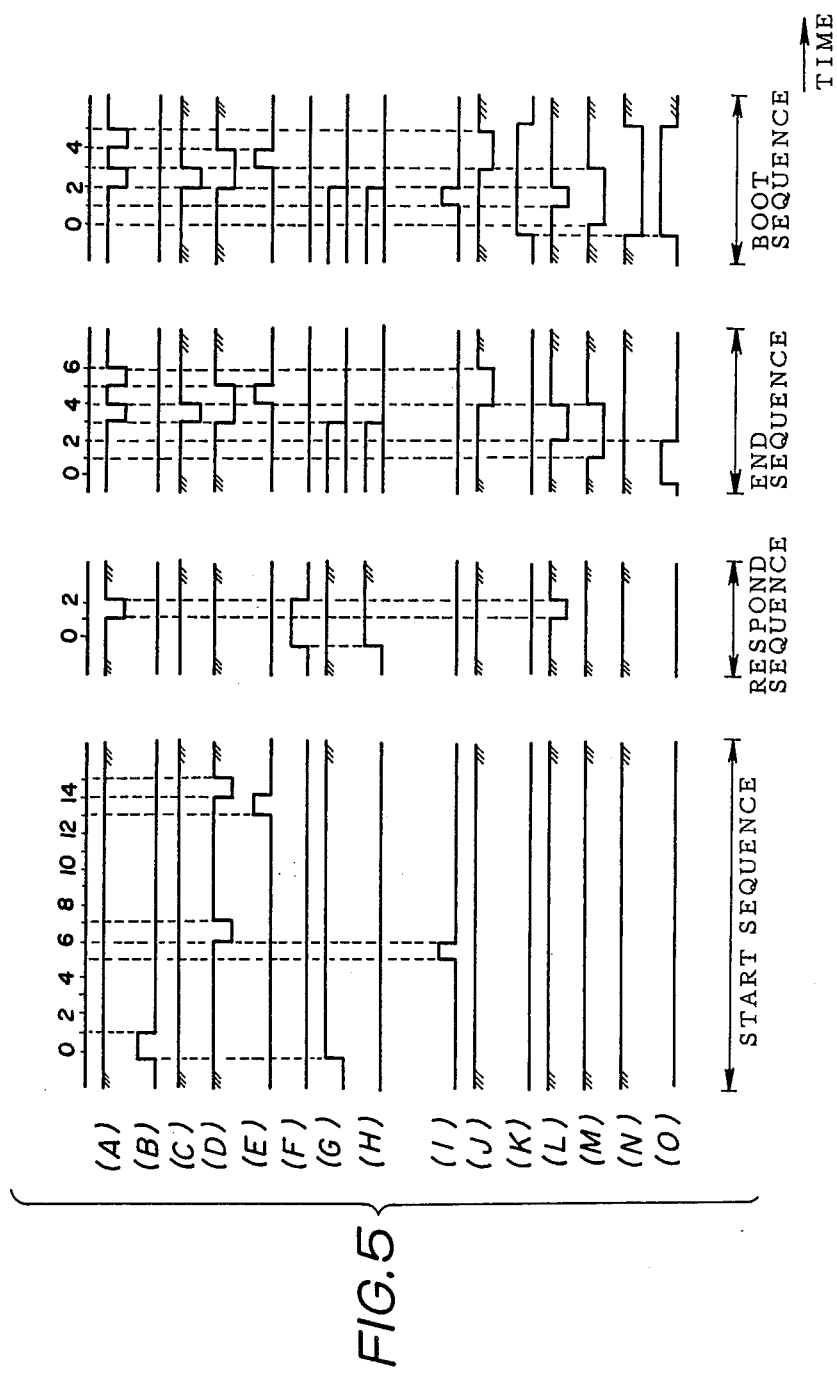
FIGS. 5(A) through 5(O) are timing charts for explaining the operation of the sequence control part shown in FIG. 4.

FIGS. 5(A) through 5(O) are timing charts for explaining the operation of the sequence control part 90 shown in FIG. 4. FIG. 5(A) shows the signal supplied to the switching gate part 40 from the terminal WRITE0, and FIG. 5(B) shows the signal supplied to the active signal producing part 100 from the terminal ENABLE0. FIGS. 5(C) through 5(F) respectively show the signals supplied to the start control part 60 from the terminals RESET0, RESET1, WRITE1 and ENABLE1, and FIGS. 5(G) and 5(H) respectively show the signals supplied to terminals START and ACK of the sequence control part 90 from the start control part 60. FIGS. 5(I) through 5(K) respectively show the signals supplied to the fault storage part 110 from the terminals WRITE2, ENABLE2 and BOOT0. FIGS. 5(L) through 5(N) respectively show the signals supplied to the end control part 70 from the terminals WRITE3, ENABLE3 and BOOT1, and FIG. 5(O) shows the signal supplied to a terminal END of the sequence control part 90 from the end control part 70.

FIGS. 5(A) through 5(O) show the signal timings with reference to the start sequence, respond (acknowledge) sequence, end sequence and boot sequence of the sequence control part 90, and the numbers above the waveform denote the number of clock pulses. In the start sequence, the sequence control part 90 detects the first input signal when a communication starts, and broadcasts the detected first input signal. In the respond sequence, the sequence control part 90 detects the returning (acknowledge) signal and fixes the communication path. In the end sequence, the sequence control part 90 stores the change in the state of the fixed communication path into the switching gate part 40 so as to fix the conditions on the communication path. Further, in the boot sequence, the sequence control part 90 initializes the setting of the node apparatus 10.

In the present embodiment, the supervision time of the end control part 70 and the sequence control part 90 for discriminating the end of the communication is variable depending on the kind of protocol of the communication. The supervision time is varied by varying the frequencies of the clock signals CK0 (CK00 through CK03) supplied to the shift registers $74_0$ through $74_3$ which supervise the end of the communication in the end control part 70 and by varying the frequency of the clock signal CK2 supplied to the shift registers 91 through 93 which produce various control signals in the sequence control part 90. The varying of the clock signal frequency is carried out for each channel depending on the pattern or information of the first sending signal received by the first receiving input channel, that is, by detecting the characteristic of the signal such as the signal transmission rate and frequency. For example, the supervision time for discriminating the end of the communication may be short in the case of a protocol having a high signal transmission rate. On the other hand, the supervision time for discriminating the end of the communication needs to be long in the case of a protocol having a low signal transmission rate.

Figure 6:
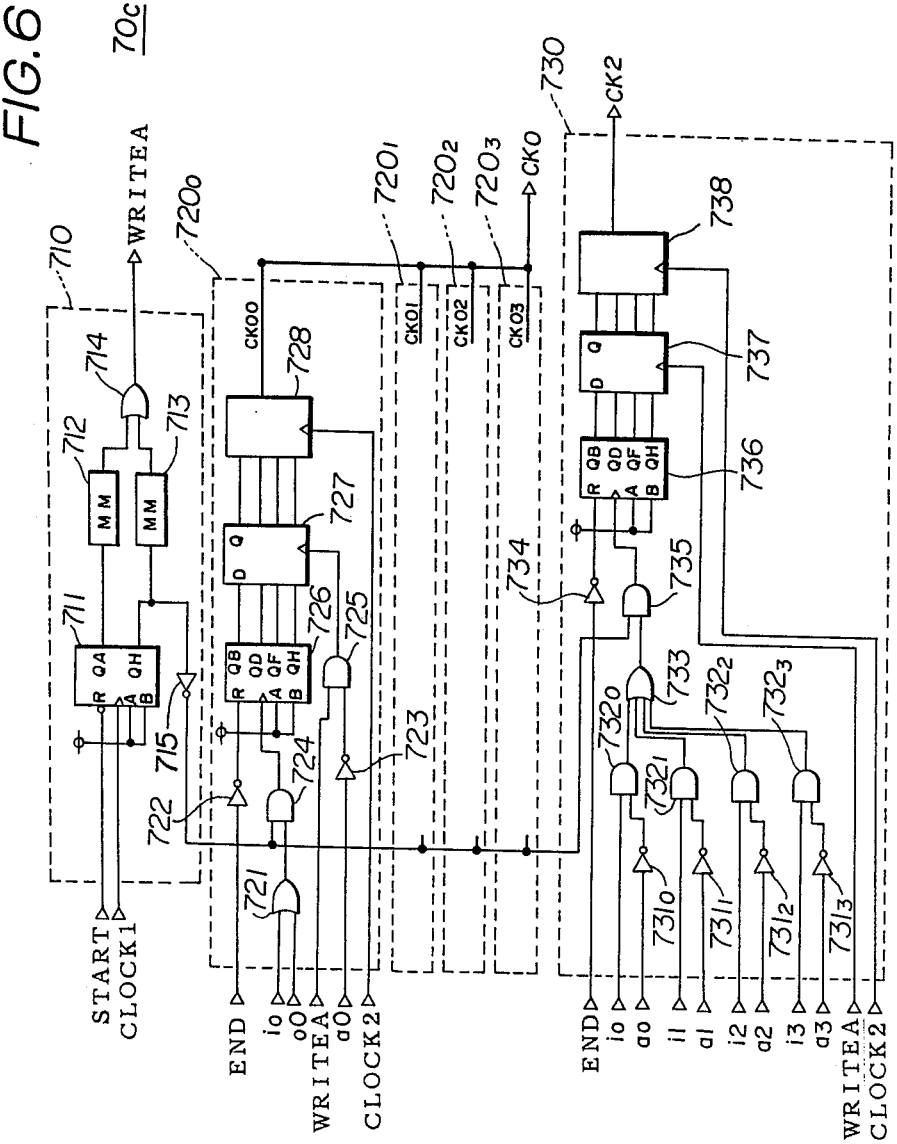
FIG. 6 is a circuit diagram showing an embodiment of a clock setting circuit of the end control part shown in FIG. 3.

FIG. 6 shows an embodiment of the clock setting circuit 70c for four input and output channels. The clock setting circuit 70c has the function of detecting the frequency of the input or output signal of a channel and controlling the fundamental operation clock frequency of the end control part 70 and the sequence control part 90 depending on the detected frequency.

The clock setting circuit 70c comprises circuit parts 710, $720_0$ through $720_3$ and 730. The circuit part 710 comprises a shift register 711, monostable multivibrators 712 and 713, an OR gate 714 and an inverter 715 which are connected as shown. The circuit part $720_0$ comprises an OR gate 721, inverters 722 and 723, AND gates 724 and 725, a shift register 726, a D flip-flop 727 and a frequency divider 728 which are connected as shown. The circuit constructions of the circuit parts $720_1$ through $720_3$ are identical to that of the circuit part $720_0$, and description and illustration thereof will be omitted. The circuit part 730 comprises inverters $731_0$ through $731_3$, AND gates $732_0$ through $732_3$, an OR gate 733, an inverter 734, an AND gate 735, a shift register 736, a D flip-flop 737 and a frequency divider 738 which are connected as shown.

A start signal START from the start control part 60 (or from the sequence control part 90 directly or indirectly through the control gate part 50) is applied to a reset terminal R and a clock signal CLOCK1 having a predetermined period is applied to a clock terminal of the shift register 711. The content of the shift register 711 is incremented (shifted) responsive to the clock signal CLOCK1. The resetting of the shift register 711 is cancelled when the level of the start signal START becomes high, and a $Q_H$-output of the shift register 711 is maintained to a low level thereafter until a predetermined time elapses by the counting of the clock signal CLOCK1. The $Q_H$-output of the shift register 711 is supplied to the monostable multivibrator 713 and the inverter 715. A $Q_A$-output of the shift register 711 is supplied to the monostable multivibrator 712. Output signals of the monostable multivibrators 712 and 713 are formed into a signal WRITEA in the OR gate 714. This signal WRITEA is a pulse having a predetermined pulse width and is supplied to each of the circuit parts $720_0$ through $720_3$ and 730.

An end signal END from the end control part 70 is supplied to a reset terminal R of the shift register 726 through the inverter 722. A signal from a corresponding channel (i0 in the case of the circuit part $720_0$) of the input port 20 and a signal from a corresponding channel (o0 in the case of the circuit part $720_0$) of the output port 30 are supplied to the OR gate 721, and an output signal of the OR gate 721 is supplied to the AND gate 724. The AND gate 724 is also supplied with an output signal of the inverter 715 in the circuit part 710. An output signal of the AND gate 724 is supplied to a clock terminal of the shift register 726. The content of the shift register 726 is incremented (shifted) responsive to the signal supplied to the clock terminal thereof, and the content of the shift register 726 is selectively outputted from one of output terminals $Q_B$, $Q_D$, $Q_F$ and $Q_H$. These output terminals of the shift register 726 are connected to corresponding input terminals D of the flip-flop 727.

The output signal (a0 in the case of the circuit part $720_0$) of a corresponding one of the SR flip-flops $73_0$ through $73_3$ of the connection storage part 70b is supplied to the AND gate 725 through the inverter 723. The signal WRITEA from the circuit part 710 is also supplied to the AND gate 725. An output signal of the AND gate 725 is supplied to a clock terminal of the flip-flop 727. An output of the flip-flop 727 is supplied to the frequency divider 728 which receives a clock signal CLOCK2. The frequency divider 728 generates the clock signal CK00.

Similarly, the circuit parts $720_1$, $720_2$ and $720_3$ generate the clock signals CK01, CK02 and CK03, respectively. The clock signals CK00, CK01, CK02 and CK03 are supplied to the clock terminals of the corresponding shift registers $74_0$, $74_1$, $74_2$ and $74_3$ of the communication end detecting part 70a.

In the circuit part 730, the inverters $731_0$ through $731_3$ receive the output signals (a0 through a3) of the corresponding flip-flops $73_0$ through $73_3$ of the connection storage part 70b. The AND gates $732_0$ through $732_3$ receive output signals of the corresponding inverters $731_0$ through $731_3$ and the signals from the corresponding channels (i0 through i3) of the input port 20. Output signals of the AND gates $732_0$ through $732_3$ are supplied to the OR gate 733, and an output signal of the OR gate 733 is supplied to the AND gate 735 which is also supplied with the output signal of the inverter 715 in the circuit part 710. An output signal of the AND gate 735 is supplied to a clock terminal of the shift register 736, and the end signal END from the OR gate 78 of the communication end detecting part 70a is supplied to a reset terminal R of the shift register 736 through the inverter 734.

Outputs of the shift register 736 are supplied to the flip-flop 737, and outputs of the flip-flop 737 are supplied to the frequency divider 738. The signal WRITEA is supplied to a clock terminal of the flip-flop 737, and the clock signal CLOCK2 is supplied to a clock terminal of the frequency divider 738. The frequency divider 738 generates the clock signal CK2.

When the input signal is received at one of the input channels of the input port 20 and the level of the start signal START from the start control part 60 (or the sequence control part 90) becomes high, the resetting of the shift register 711 of the circuit part 710 is cancelled. Thus, the shift register 711 starts to count the clock signal CLOCK1, and the $Q_H$-output of the shift register 711 is maintained to the low level until the counted value reaches a predetermined value.

While the level of the $Q_H$-output of the shift register 711 is low, one input of each AND gate 724 of the circuit parts $720_0$ through $720_3$ has a high level. Hence, when one of the two inputs of each OR gate 721 receives a signal, the shift register 726 increments (shifts) the content thereof responsive to the output signal of the OR gate 721 obtained through the AND gate 724. In other words, the shift register 726 increments (shifts) the content thereof when a signal exists in a channel during a predetermined time after a signal is received by an input channel.

A time period in which the $Q_H$-output of the shift register 711 has the low level is constant. For this reason, the shift register 726 increments (shifts) the content thereof during this constant time period responsive to the output signal of the AND gate 724, and a corresponding one of the outputs $Q_B$, $Q_D$, $Q_F$ and $Q_H$ becomes high. In other words, as will be described later, the signal which first reaches the input channel is a preamble P. Therefore, the content of the outputs $Q_B$, $Q_D$, $Q_F$ and $Q_H$ of the shift register 726 corresponds to the number of pulses of the preamble P counted during the constant time period. For example, the outputs $Q_B$, $Q_D$, $Q_F$ and $Q_H$ of the shift register 726 are dependent on the frequency of the preamble P.

When the communication path is fixed and the channel is presently used for the communication, the output signal level of one of the flip-flops $73_0$ through $73_3$ in the corresponding channel of the connection storage part 70b is high. Since the output signal level of the inverter 723 is low, the supply of the clock signal to the clock terminal of the flip-flop 727 is blocked (masked) by the AND gate 725.

However, before the communication path is fixed, the output signal level of the corresponding channel of the connection storage part 70b is low. Hence, the output signal level of the inverter 723 is high. On the other hand, when the $Q_H$-output of the shift register 711 becomes high after the predetermined time period described before elapses, the level of the output signal WRITEA becomes high for the predetermined pulse width. Thus, one input of the AND gate 725 becomes high, and the output clock signal of the AND gate 725 is supplied to the clock terminal of the flip-flop 727. As a result, the logic state of the flip-flop 727 is set to that at the input terminal D thereof, and the Q-output of the flip-flop 727 is supplied to the frequency divider 728.

The frequency divider ratio of the frequency divider 728 is set by the Q-output of the flip-flop 727. Depending on the Q-output of the corresponding flip-flop 727, the frequency divider 728 in each of the circuit parts $720_0$ through $720_3$ generates the clock signal CK00, CK01, CK02 or CK03 with the set frequency dividing ratio. As described before, the clock signals CK00 through CK03 are supplied to the clock terminals of the shift registers $74_0$ through $74_3$ of the communication end detecting part 70a.

Therefore, the signals from one channel of the input and output ports 20 and 30 received during the predetermined time period from the time when the level of the start signal START becomes high to the time when the $Q_H$-output of the shift register 711 becomes high are supplied to the clock terminal of the shift register 726 of the corresponding one of the circuit parts $720_0$ through $720_3$ through the OR gate 721 and the AND gate 724. The output value of the shift register 726 changes depending on the number of pulses received during the predetermined time period, thereby changing the frequency of the clock signal CK0 generated by the frequency divider 728. The output signal of the monostable multivibrator 713 is formed into the signal WRITEA to fix the output of the shift register 726 in the flip-flop 727. The signal WRITEA is masked by the output signals (a0 through a3) of the flip-flops $73_0$ through $73_3$ so that it is only supplied to the circuit parts $720_0$ through $720_3$ corresponding to the channel not included in the fixed communication path. On the other hand, the output signal of the monostable multivibrator 712 is formed into the signal WRITEA to change the value of the flip-flop 727 when the shift register 711 starts to count, thereby initializing the frequency divider 728.

The operation of the circuit part 730 is similar to that of the circuit part $720_0$ except that the signal used is from a channel of the input port 20 not included in the fixed communication path. The clock signal CK2 from the frequency divider 738 of the circuit part 730 is supplied to the shift registers 91 and 93 of the sequence control part 90.

Therefore, the end of the communication is supervised and the control signals of various timings are generated responsive to the clock signals CK00 through CK03 and CK2. The end of the communication is supervised with a communication end supervision time having a length in accordance with the protocol of the fixed communication path.

According to the present embodiment, the supervision time for discriminating the end of the communication is finely variable depending on the kind of protocol of the communication in the fixed communication path. The frequency of the preamble P included in the first sending signal received by the input channel is detected, and the length of the communication end supervision time is variably set depending on the detected frequency. However, it is possible to modify the circuit construction of the clock setting circuit 70c so as to read the information contained in the sending signal instead of the frequency of the preamble P. It is possible to read at least a portion of the first sending signal for fixing the communication path.

In the present embodiment, the length of the communication end supervision time is controlled by making the fundamental operation clock frequency variable for the end control part 70 and the sequence control part 90. However, it is possible to take measures so that the preset value of the shift register or counter for supervising the end of the communication is variable.

In other words, the node apparatus 10 needs to be provided with a circuit for variably controlling the length of the supervision time which is used to discriminate the end of the communication, by reading at least a portion of the pattern of the first sending signal for fixing the communication path. In addition, it is possible to carry out a similar control by reading the pattern of the signal sent before the message in the first sending signal.

Therefore, according to the present embodiment, the end of the communication is discriminated with a timing appropriate for each protocol, and the efficiency of the communication network as a whole is improved.

In the initial state, when the input signal is supplied to one of the input channels i0 through i3 (i0 through i7 in FIG. 2), the first input signal detecting part of the start control part 60 detects which one of the input channels i0 through i3 receives the input signal first according to the first-come-first-output logic. As a result, only the first receiving input channel is coupled to those output channels other than the output channel having a channel number corresponding to that of the first receiving input channel. In other words, a broadcast communication is made by transferring the input signal which is received by the first receiving input channel of the input pot 20 to all of the output channels of the output port 30 except for the output channel having the channel number corresponding to that of the first receiving input channel.

When the first input signal detecting part of the start control part 60 detects the first receiving input channel, the sequence control part 90 is activated, and the sequence control part 90 starts a time supervision with the active detection time constant.

The active detection time constat is provided to receive active signals from input channels other than the first receiving input channel. Accordingly, even when the input signal (first sending signal) from the same source as the input signal received by the first receiving input channel is received by another input channel or when another input signal (another sending signal) from another source is received by another input channel, the input signals (sending signals) received by the input channels other than the first receiving input channel can be received.

The length of the active detection time constant is set to a time which is essentially equal to a sum of a propagation delay time for a return trip covering a maximum tolerable distance between the node apparatus 10 and another node apparatus 10 or the terminal device 14 and the duration of the active signal. Normally, a slight margin time is added to the length of the active detection time constant. The input signal (first sending signal) identical to that received by the first receiving input channel but obtained through a roundabout route are received by an input channel other tha the first receiving input channel, the input signals (other sending signals) from other sources are received by the input channels other than the first receiving input channel and the active signal is received from the active signal producing part 100, all within the length of the active detection time, constant. Hence, it is possible to detect the faulty or dormant channels.

The input channels which receive the input signals within a first supervision time defined by the active detection time constant are stored in flip-flops of the input signal detecting part of the start control part 60. When the first supervision time ends, the clock signal from the terminal WRITE2 of the sequence control part 90 drives the fault storage part 110. As a result, one of the input channels i0 through i3, one or more input channels which receive no input signal during the first supervision time are stored in the fault storage part 110 as being faulty or dormant input channels.

Next, the sequence control part 90 carries out a time supervision of the input signal detection time constant. The input signal detection time constant is provided to detect whether or not there is an input signal after the supervision time defined by the active detection time constant. For example, the length of the input signal detection time constant is one bit in the case of the Manchester encoding, and is seven or more bits in the case of the encoding in which "0" is inserted into six consecutive "1"s in NRZI. Normally, a slight margin time is added to the one or seven bits to make it two times longer, and the length of the input signal detection time constant is set to two bits or fourteen or more bits. The supervision time defined by the input signal detection time constant is thus provided to detect the input channels which receive the input signal (first sending signal) identical to that received by the first receiving input channel but obtained through a roundabout route, and the input signals (other sending signals) from sources other than the source of the input signal (first sending signal) received by the first receiving input channel.

One or more input channels which receive input signals within the supervision time defined by the input signal detection time constant are stored in the flip-flops of the input signal detecting part of the start control part 60. When this supervision time ends, the input channel which receives no input signal within the supervision time but thereafter receives an input signal is coupled to the output channel having the channel number corresponding to that of the first receiving input channel by the switching gate part 40.

When the input signal ceases in any of the input channels included in the communication path and a third supervision time defined by the communication end detection time constant elapses, the end control part 70 instructs the sequence control part 90 to reset the first input signal detecting part and the input signal detecting part of the start control part 60 to the initial state. As described before, the communication end detection time constant is set by determining the frequencies of the clock signals CK0 (CK00 through CK03) and CK2 depending on the detected frequency of the preamble P of the first sending signal and supplying the clock signal CK0 to the end control part 70 and the clock signal CK2 (together with CK1 and CK3) to the sequence control part 90.

The end of the communication may be detected from the input signal received by the first receiving input channel, so that a restore process is carried out when the input signal is no longer received by the first receiving input channel. Alternatively, it is possible to carry out the restore process when the input signal is no longer obtained at either one of the first receiving input channel or the output channels coupled to the first receiving input channel. It is possible to detect that an input signal is no longer obtained at a channel when the logic value of the input signal remains the same (for example, "0") for a certain time.

According to the present embodiment, the data on an input channel which receives a signal during the first supervision time but receives no signal during the second supervision time is stored in the input signal detecting part of the start control part 60 even after the second supervision time, and only the input signal to such an input channel can be detected. It is possible to thereafter couple such an input channel to the output channel having the channel number corresponding to that of the first receiving input chanel, and disconnect all of the other remaining input channels from the output channels.

When a certain input channel which receives a signal during the first supervision time but receives no signal during the second supervision time thereafter receives a first returning signal, the certain input channel is coupled to the output channel having the channel number corresponding to that of the first receiving input channel and the first receiving input channel is coupled to the output channel having a channel number corresponding to that of the certain input channel, so as to fix the coupling between the input and output channels of the node apparatus 10. All of the input channels other than the certain input channel and the first receiving input channel are connected to the output channels other than the output channels having the channel numbers corresponding to those of the certain input channel and the first receiving input channel. As a result, it is possible to avoid receiving signals such as noise which are other than the first returning signal which is originally to be received.

Next, a description will be given on the sequence of the communication made in a lattice communication network using four node apparatuses 10 described heretofore, by referring to FIGS. 7A through 7E. For convenience' sake, four node apparatuses 10A through 10D are coupled in the lattice form through transmission paths 12A, 12AB, 12AC, 12BD, 12CD and 12D each having four channels in FIGS. 7A through 7E. A terminal device 14A is coupled to the node apparatus 10A, and a terminal device 14D is coupled to the node apparatus 10D. In FIGS. 7A through 7E, a dot-pattern is provided on the transmitting side of each node apparatus or terminal device, a bold arrow indicates the flow of the sending signal, and an arrow with hatchings indicates the flow of the active signal and the returning signal.

When carrying out the full duplex communication in the present embodiment, the detection of the input signal and the control of the coupling between the input and output channels based on this detection are carried out in the following five basic steps.

Firstly, the lattice communication network is in the initial state, and in a first step shown in FIG. 7A, the terminal device 14A, for example, transmits a first sending signal in the form of the message packet. The sending signal includes a destination address indicative of the intended destination of the sending signal, and the intended destination included in the first sending signal is the terminal device 14D in this case. The first sending signal is supplied to the node apparatus 10A through the transmission path 12A. In the initial state, each input channel of the node apparatus 10A is coupled to all of the output channels thereof except the output channel having a channel number corresponding thereto.

When the node apparatus 10A detects that the first sending signal from the terminal device 14A is received first, the node apparatus 10A transfers the first sending signal to all of the output channels thereof except the output channel having the channel number corresponding to that of the first receiving input channel which is connected to the transmission path 12A. In other words, the first sending signal is broadcasted from the node apparatus 10A from the output channels connected to the transmission paths 12AB, 12AC and the like. In addition, the node apparatus 10A disconnects from the output channels thereof the input channels which are other than the first receiving input channel and are not in the fixed transmission pah, and an active signal 230A is produced from the active signal producing part 100 and is outputted from the output channel of the node apparatus 10A having the channel number corresponding to that of the first receiving input channel which is connected to the transmission path 12A.

Figure 7B:
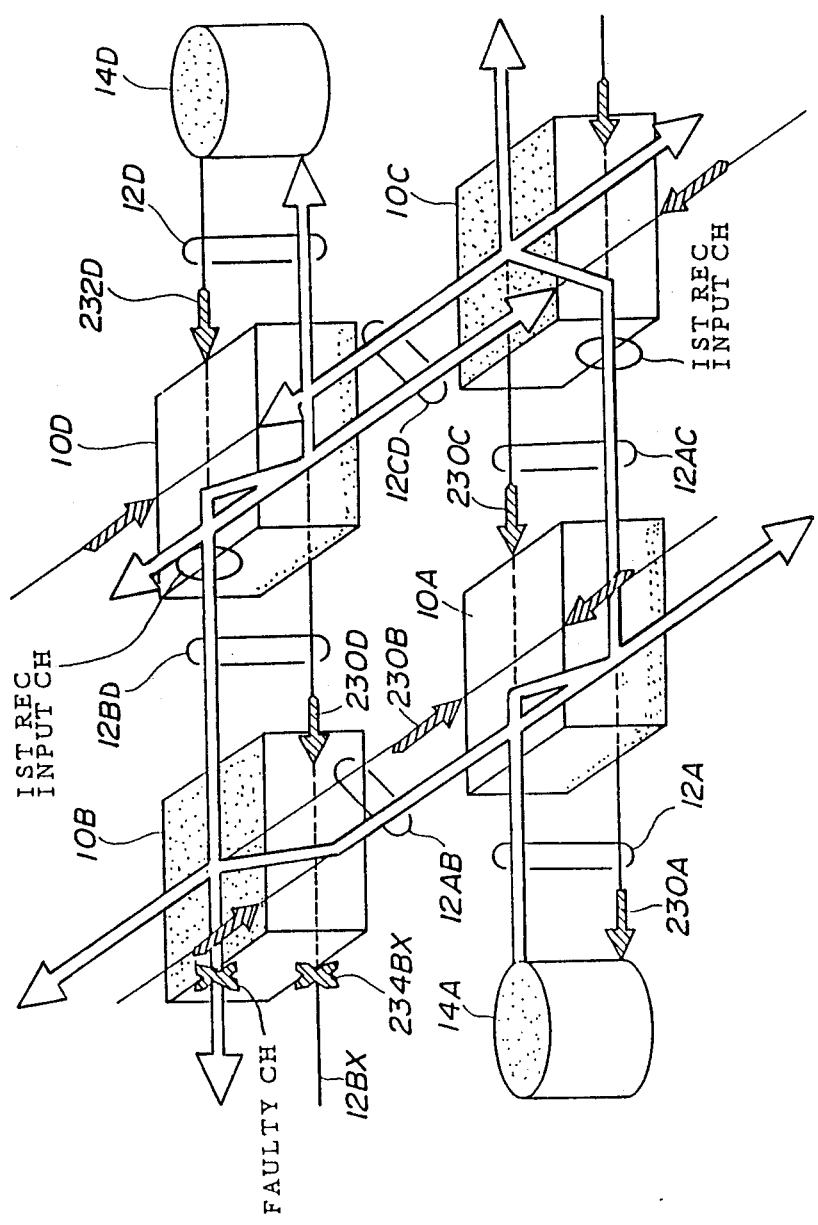

Next, in a second step shown in FIG. 7B, the node apparatus 10B receives the first sending signal through the transmission path 12AB, the node apparatus 10C receives the first sending signal through the transmission path 12AC, and the node apparatus 10D receives the first sending signal through the transmission paths 12BD and 12CD. The node apparatuses 10B, 10C and 10D broadcast the first sending singal similarly as in the case of the node apparatus 10A. In this case, the node apparaus 10C detects the input channel thereof connected to the transmission path 12AC as being the first receiving input channel. Hence, the first sending signal received through the transmission path 12AC is broadcasted through the transmission paths other than the transmission path 12AC, that is, through the transmission path 12CD and the like. In addition, the node apparatus 10C supplies an active signal 230C to an output channel thereof having a channel number corresponding to that of the first receiving input channel which is connected to the transmission path 12AC.

The node apparatus 10D receives the first sending signal from the transmission paths 12BD and 12CD, but detects the input channel thereof connected to the transmission path 12BD as being the first receiving input channel. Hence, the node apparatus 10D broadcasts only the first sending signal received through the transmission path 12BD to other transmission paths such as the transmission paths 12D and 12CD. The first sending signal received through the transmission path 12CD is not broadcasted from the node apparatus 10D. In addition, the node apparatus 10D supplies an active signal 230D to an output channel thereof having a channel number corresponding to that of the first receiving input channel which is connected to the transmission path 12BD.

In the node apparatuses 10C and 10D, when the difference between the arrival time of the first sending signal received by the first receiving input channel and the arrival time of the first sending signal received thereafter by anothr input channel is shorter than the time it takes for the control of the coupling of the input and output channels to be completed, a signal overlap occurs for an instant. However, this signal overlap occurs within the beginning portion of a preamble of the message packet and is negligible, and for this reason, no problems will be caused thereby. Thus, the first sending signal transmitted from the terminal device 14A and broadcasted from the node apparatus 10A is transmitted within the communication network without any signal overlap that would cause problems. Further, this negligible signal overlap is not accumulated at each node apparatus, since the signal overlap always occurs within the same beginning portion of the preamble of the message packet.

Each of the node apparatuses 10A through 10D supervise all of the input channels thereof within the first supervision time which starts from the detection of the first receiving input channel, so as to detect the input channel which receives no signal during the first supervision time. The data on the input channel which receives no signal during the first supervision time is stored in the input signal detecting part of the start control part 60. In the normal state where no fault exists in the node apparatus nor the node apparatuses and the terminal devices coupled thereto, the active signal or the first sending signal should arrive to the input channels during this first supervision time. When the active signal does not arrive to an input channel, this input channel is discriminated as being a faulty or dormant input channel, and the data on the faulty or dormant input channel is stored in the fault storage part 110. For example, in FIG. 7B, an input channel 234BX of the node apparatus 10B connected to a transmission path 12BX is a faulty or dormant input channel.

Each of the node apparatuses 10A through 10D supervise all of the input channels thereof within the second supervision time which starts after the lapse of the first supervision time. At this time, the active signal is already ended. The input channel which receives no input signal during the second supervision time may be coupled to all of the output channels other than the output channel having a channel number corresponding to that of this input channel. The input channel which receives no input signal during the second supervision time and is not identified as being a faulty or dormant input channel in the fault storage part 110 may be coupled to all of the output channels other than the output channel having a channel number corresponding to that of this input channel.

Figure 7C:
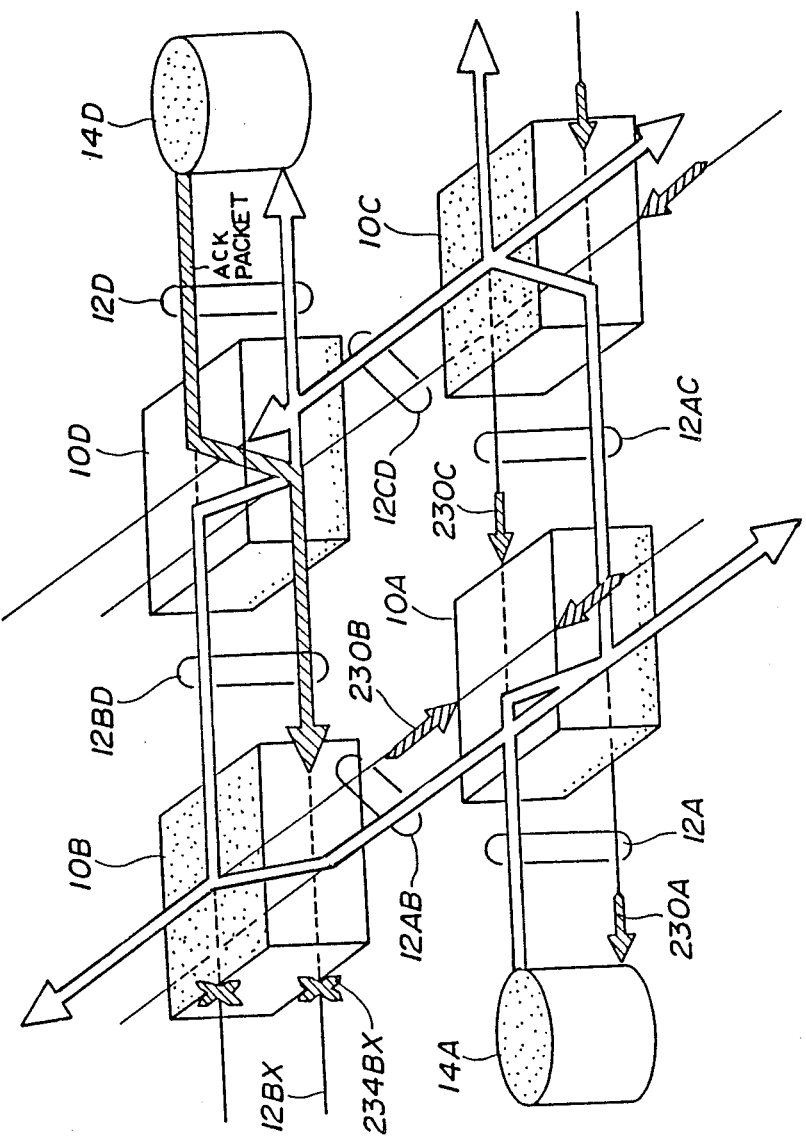

In a third step, the terminal devices coupled to the node apparatuses 10A through 10D receive the first sending signal originating from the sending terminal device 14A, and each terminal device returns the active signal as the returning signal upon receipt of the first sending signal and also collates its own address with the destination address included in the first sending signal. In this case, the terinal device 14D returns an active signal 232D as shown in FIG 7B, and since the destination address included in the first sending signal coincides with the address of the terminal device 14D, the terminal device 14D transmits a first returning signal to the transmission path 12D. When the node apparatus 10D receives the first returning signal from the transmission path 12D as shown in FIG. 7C, the node apparatus 10D detects out of the input channels having channel numbers corresponding to those of the output channels from which the first sending signal was transmitted the input channel which receives no signal during the second supervision time but receives a signal after the end of the second supervision time. This detected input channel is coupled to the output channel having the channel number corresponding to that of the first receiving input channel.

In the case shown in FIG. 7C, when the node apparatus 10D receives the first returning signal from the transmission path 12D after a predetermined time elapses from the second supervision time, the node apparatus 10D connects the input channel which receives the first returning signal to the output channel which has a channel number corresponding to that of the first receiving input channel and is connected to the transmission path 12BD. Accordingly, the first returning signal from the transmission path 12D is outputted from the node apparatus 10D through the transmission path 12BD.

Then, after a terminal response supervision time in the case of the full duplex communication and after the third predetermined time defined by the communication end detection time constant in the case where both the full duplex communication and the half duplex communication are to be enabled, the node apparatus 10D couples all of the remaining input channels to all of the output channels other than the output channel having the channel number corresponding to that of the input channel which received the first returning signal. As a result, it is possible to prevent the node apparatus 10D from detecting the first sending signal from the transmission path 12CD shown in FIG. 7D. In other words, in this case, the transmission paths 12BD and 12D become coupled to each other.

In a fourth step, the node apparatuses 10B and 10A carry out control similar to that carried out by the node apparatus 10D. Hence, as shown in FIG. 7D, the first returning signal reaches the terminal device 14A through the communication path which was used to transfer the first sending signal. The first sending signal has a predetermined length, and the terminal devices such as the terminal device 14D transmit the first returning signal immediately after the destination address of the first sending signal is discriminated. Accordingly, the first sending signal and the first returning signal are transmitted simultaneously. For this reason, even when terminal devices othr than the terminal devices 14A and 14D are connected to the communication network, these other terminal devices receive the overlapping first sending signal and the first returning signal and cannot discriminate the information content due to the interference caused by the overlap. Therefore, the secrecy of the transmission to the other terminal devices which is very important in the communication network is maintained. In addition, it is possible to carry out the multi-channel communication.

Figure 7E:
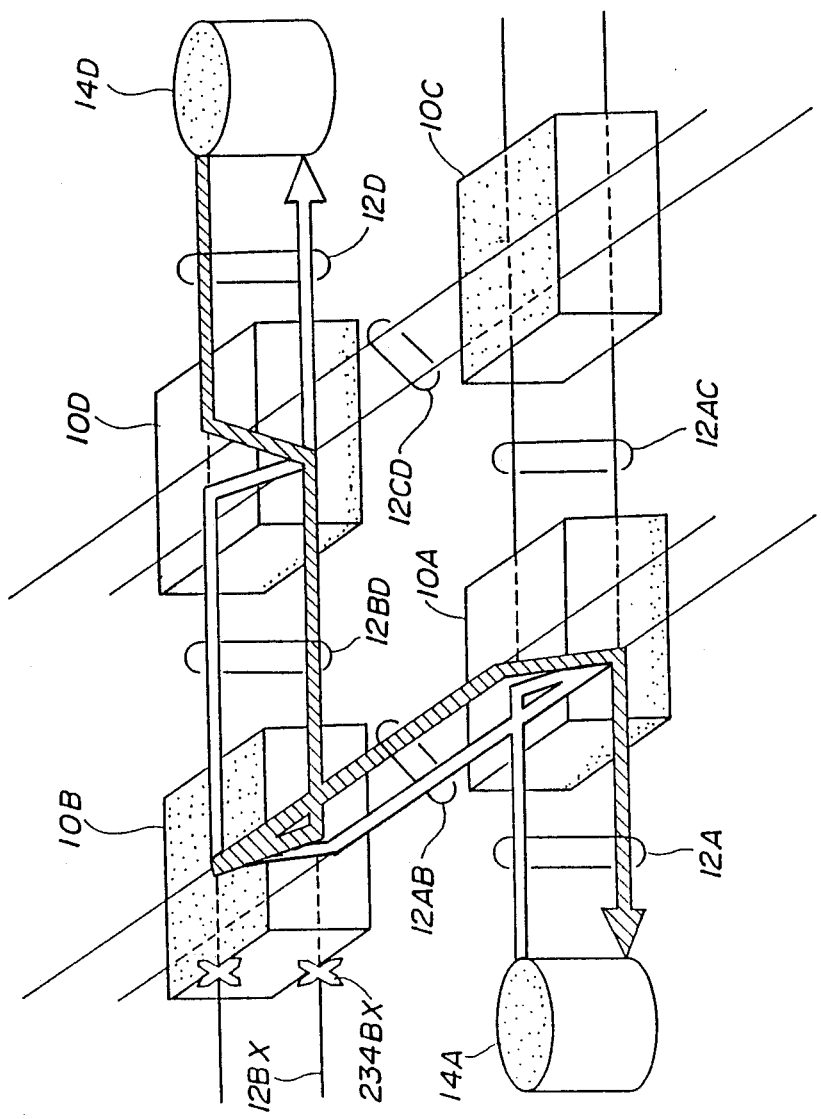

In a fifth step shown in FIG. 7E, when the node apparatus 10C detects that the first returning signal is not received through the transmission path 12CD and the like and the first sending signal is no longer received through the transmission path 12AC, the node apparatus 10C couples each of the input channels to all of the output channels other than the output channel having a channel number corresponding thereto. In other words, when the node apparatus 10C detects that no input signal is received during the second supervision time, that the first returning signal is not received even after the second supervision time and that the first sending signal is no longer received, the node apparatus 10C couples each of the input channels to all of the output channels other than the output channel having a channel number corresponding thereto. This means that the communication path is fixed by way of paths excluding the node apparatus 10C or that the communication is not completed and the terminal device 14A has discontinued to send the first sending signal. Accordingly, in all other cases, the arrival of the first returning signal within the terminal response supervision time starting from the detection of the first receiving input channel is guaranteed. When the sending signal does not reach the terminal device 14D for some reason and the terminal device 14A discontinues the transmission of the first sending signal because the first returning signal is not received, the node apparatus 10C couples each of the input channels to all of the output channels other than the output channel having a channel number corresponding thereto.

In the case where both the full duplex communication and the half duplex communication are to be enabled, when the node apparatus 10C detects that the first sending signal is no longer received through the transmission path 12AC and the first returning signal is not received through the transmission path 12CD and the like even after the third supervision time defined by the communication end detection time constant elapses, the node apparatus 10C couples each of the input channels to all of the output channels other than the output channel having a channel number corresponding thereto. In other words, when the node apparatus 10C detects that there are input channels which do not receive the first sending signal and do not receive the first returning signal during the terminal response supervision time which starts from the end of the first sending signal, the node apparatus 10C couples each of these input channels to all of the output channels other than the output channel having the channel number corresponding thereto.

By carrying out such a control of the connection, a communication path is set and fixed for the communication between the sending terminal device 14A and the destination terminal device 14D. Each node apparatus 10 can set and control the new communication in a new path which is not included in the fixed communication path.

Therefore, each node apparatus 10 detects the existence or non-existence of the input signal and carries out sequential control during the times defined by the active detection time constant, the input signal detection time constant, the terminal response supervision time and the communication end detection time constant. For example, in the case where the sending terminal device 14 from which the first sending signal originates is authorized to continue and end the full duplex communication, that is, normally when the interval of the sending signal is shorter than the time it takes to detect the end of the signal and the returning signal is transmitted intermittently, the node apparatus 10 detects that a signal is no longer received by the pair of input channels in the fixed communication path or detects that a signal is no longer received by either one of the pair of input channels in the fixed communication path. In this case, the node apparatus 10 couples all of the input channels to all of the output channels other than the output channels having channel numbers corresponding to those of the pair of input channels in the fixed communication path. In this state, the returning signal is not transmitted.

In the case of the half duplex communication and in the case of the full duplex communication where no priority needs to be set for the transmitting station and the receiving station, the node apparatus 10 detects that a signal is no longer received by neither channels of the pair of input channels in the fixed communication path, and couples all of the input channels to all of the output channels other than the output channels having channel numbers corresponding to those of the pair of input channels in the fixed communication path.

Figure 8:
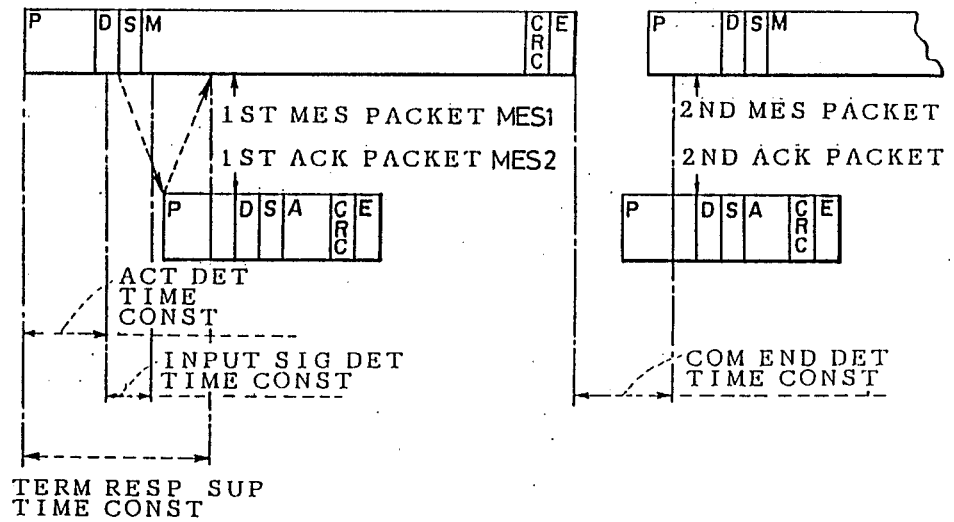
FIG. 8 is a diagram for explaining the flow of message packets when a returning signal (acknowledge packet) is returned normally in response to a sending signal in the full duplex communication.

FIG. 8 is a diagram for explaining the flow of the message packets when the returning signal (acknowledge packet) is returned normally in response to the sending signal in the full duplex communication. As shown in FIG. 8, a message packet MES1 which is transmitted as the first sending signal includes a preamble P and a destination address D before a message M. The preamble P continues for at least a predetermined time so as to enable synchronism with the terminal device 14. There are no other restrictions on the message packet MES1, but normally, the message packet MES1 also includes an origin address S indicating the address of the sending terminal device 14 from which the message packet MES1 originates. A check code area CRC for the cyclic redundancy code (CRC) and the like and a packet end code E follow the message M, and it is possible to provide a postamble (not shown) after the packet end code E for the purpose of maintaining the terminal device 14 is synchronism.

The terminal device 14 transmits the active signal immediately when the first sending signal, that is, the message packet MES1, is first received. When the terminal device 14 discriminates that destination address D of the received message packet MES1 coincides with its own address, the terminal device 14 transmits the first returning signal immediately after this discrimination is made in the case shown in FIG. 8 for the full duplex communication.

Figure 9:
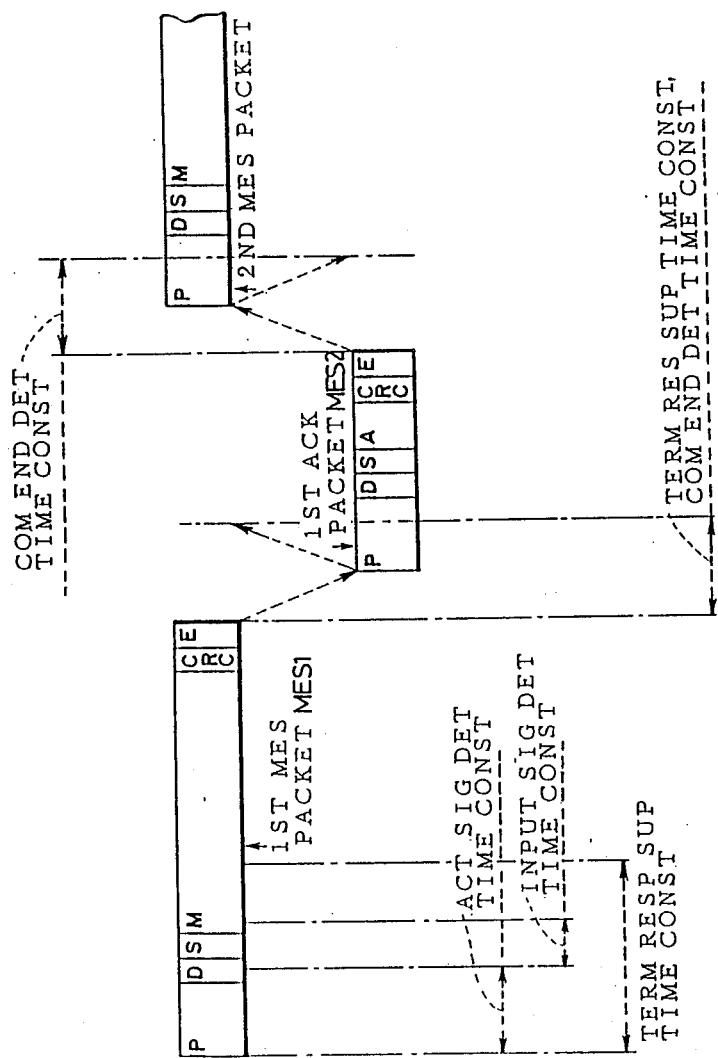
FIG. 9 is a diagram for explaining the flow of message packets when the returning signal (acknowledge packet) is returned normally in response to the sending signal in the half duplex communication.

FIG. 9 is a diagram for explaining the flow of the message packets when the first returning signal (acknowledge packet) is returned normally in response to the first sending signal in the half duplex communication. Hence, when the terminal device 14 discriminates that destination address D of the received message packet MES1 coincides with its own address, the terminal device 14 transmits the first returning signal immediately after the message packet MES1 ends in the case shown in FIG. 9 for the half duplex communication.

There are no restrictions on an acknowledge packet MES2 which is transmitted as the first returning signal, but normally, the first returning signal has a format similar to the message packet MES1 shown in FIGS. 8 or 9. In other words, the first returning signal (acknowledge packet) comprises the preamble P, the destination address D, the origin address S of the destination terminal device 14 which received the first sending signal (message packet MES1), and an acknowledge code A or a not acknowledge code A. The message M may follow the acknowledge or not acknowledge code A.

As described before, the transmission of the first returning signal to the sending terminal device 14 from which the first sending signal originates is preferentially guaranteed.

In the case of the full duplex communication, the terminal device 14 may discontinue the transmission when no input signal is received within the first supervision time from the time when the transmission of the first sending signal starts or when an input signal is received within the second supervision time following the first supervision time.

The sending terminal device 14 from which the first sending signal originates supervises the receipt of the first returning signal from the destination terminal device 14 during a terminal response supervision time having a predetermined length. When the receipt of the first returning signal is detected within the terminal response supervision time, it is discriminated that the destination terminal device 14 can respond normally and that the communication can be continued.

When no input signal is received by the sending terminal device 14 within the first supervision time defined by the active detection time constant from the time when the sending of the first sending signal starts, or when an input signal is received by the sending terminal device 14 within the second supervision time defined by the input signal detection time constant, the communication is discontinued. In the former case, there is a fault in the transmission path 12 or node apparatus 10 which is connected to the sending terminal device 14, and it is necessary to restore the faulty transmission path 12 or node apparatus 10. On the other hand, in the latter case, there is a collision between the sending terminal device 14 and the node apparatus 10 which is connected to the sending terminal device 14, and the sending terminal device 14 must re-transmit the first sending signal.

Figure 10:
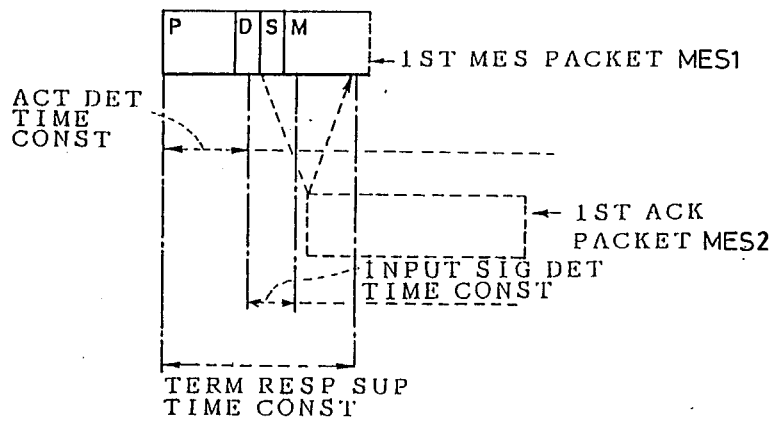
FIG. 10 is a diagram for explaining the flow of message packets when the returning signal (acknowledge packet) is not returned normally in response to the sending signal in the full duplex communication.

When no receipt of the first returning signal from the destination terminal device 14 is detected during the terminal response supervision time, it is discriminated that the first sending signal did not reach the destination terminal device 14 or that the destination terminal device 14 is unable to respond normally, and the communication is discontinued as shown in FIG. 10. FIG. 10 is a diagram for explaining the flow of the message packets when the first returning signal (acknowledge packet) is not returned normally in response to the first sending signal in the full duplex communication. The sending terminal device 14 from which the first sending signal originates may re-transmit the first sending signal, and the control in this case may be similar to that carried out in the communication employing the CSMA method. Accordingly, it is possible to fix a communication path between the sending and destination terminal devices 14, and carry out the communication by the exclusive use of the fixed communication path.

In the case of the full duplex communication, the terminal response supervision time starts from the time when the sending terminal device 14 begins transmission of the first sending signal. The length of the terminal response supervision time is set essentially equal to a sum of the propagation delay time for a return trip covering a maximum tolerable distance between the node apparatus 10 and another node apparatus 10 or terminal device 14 and the time it takes for the destination terminal device 14 to begin transmission of the first returning signal from the time when the first sending signal is received. Normally, a slight margin time is added to the length of the terminal response supervision time.

In the case where both the full duplex communication and the half duplex communication are to be enabled, the terminal response supervision time starts from the time when the transmission of the first sending signal from the sending terminal device 14 ends. In this case, the length of the terminal response supervision time is set essentially equal to a sum of the propagation delay time for a return trip covering a maximum tolerable distance between the node apparatus 10 and another node apparatus 10 or the terminal device 14 and the time it takes for the destination terminal device 14 to begin transmission of the first returning signal from the time when the receipt of the first sending signal ends. Normally, a slight margin time is also added to the length of this terminal response supervision time. The receipt of an input signal by the node apparatus 10 within the terminal response supervision time is guaranteed.

The destination terminal device 14 may be designed to report the receipt of the first sending signal after the first sending signal is correctly received. In other words, this may be realized by sending the first returning signal immediately after the receipt of the first sending signal ends. The acknowledge or not acknowledge code is included in such first returning signal.

When the terminal device 14 transmits another sending signal or a returning signal in succession to the first sending signal or the first returning signal, that is, when the terminal device 14 transmits a plurality of message packets in succession, the intervals of the message packets should not exceed the third predetermined time defined by the communication end detection time constant described before. In other words, in order to continue the communication by exclusively using the fixed communication path, a message packet should be sent within the third predetermined time after an end of a previous message packet.

In the case of the full duplex communication, a dummy signal such as the postamble is inserted between two successive message packets (for example, between an Nth message packet and a (N+1)th message packet) so that the third predetermined time will not be exceeded. On the other hand, in the case of the half duplex communication, the destination terminal device 14 transmits an Nth returning signal within the third predetermined time after the receipt of an Nth sending signal ends and preferably immediately after the receipt of the Nth sending signal ends, while the sending terminal device 14 from which the Nth sending signal originates sends a (N+1)th sending signal within the third predetermined time after the receipt of the Nth returning signal ends and preferably immediately after the receipt of the Nth returning signal ends. Similarly, even when the data is transmitted in a form other than message packets such as when transmitting audio or video information, the length of the no-signal state should not exceed the third predetermined time.

The communication can be ended by simply stopping the transmission of the signal from the terminal device 14.

According to the present embodiment, the degree of freedom with respect to the following points is high provided that the detection of the input signal and the control of the coupling of the input and output channels based on this detection are carried out in the five basic steps described before.

Firstly, there is not limit to the maximum and minimum lengths of the message packet, and it is not essential that the data take the form of the message packet.

Secondly, there is no limit to the number of times the sending signal and the returning signal may be repeated, and the fixed communication path may be used exclusively therefor.

Thirdly, it is possible to freely determine the data transmission rate between the sending and destination terminal devices provided that the data transmission rate is less than the maximum data transmission rate determined by the hardware constituting the communication network.

Fourthly, it is possible to freely select either one of the full duplex communication and the half duplex communication, and it is also possible to enable both the full duplex communication and the half duplex communication within the communication network.

In summary, according to the present embodiment, the node apparatus 10 enables a multi-channel communication in which the sending signal and the returning signal can be transferred simultaneously. The faulty node apparatus or line may be avoided when forming the link according to the first-come-first-output logic, thereby maintaining a high data survivability within the lattice communication network.

Furthermore, the node apparatus 10 can detect the end of the communication with an appropriate timing in accordance with the kind of protocol. In other words, the node apparatus 10 is provided with a circuit which variably controls the length of the communication end supervision time by reading a portion or all of the pattern of the first sending signal for fixing the communication path, with respect to each channel. Accordingly, the supervision time for detecting the end of the communication is finely controlled with an appropriate timing according to the kind of protocol. Since the communication end supervision time is variable for each channel in each node apparatus 10, communications of different protocols, that is, different signal transmission rates, may coexist in the communication network, thereby improving the efficiency of the communication network as a whole.

Of course, the node apparatus of the present invention is applicable not only to an OSI of a local area network, but is also effectively applicable to a public line network and network control.

Further, the present invention is not limited to these embodiments, but various variations and modifications may be made without departing from the scope of the present invention.

What is claimed is:

1. A node apparatus for a communication network having a multi-conjunction architecture, said communication network having a plurality of transmission paths each coupling one node apparatus to another node apparatus or a terminal device, said node apparatus comprising:
    an input port comprising a plurality of input channels connected to the transmission paths;
    an output port comprising a plurality of output channels connected to the transmission paths;
    a switching gate part for coupling said input and output channels of said input and output ports; and
    control means comprising first and second control parts for controlling said switching gate part to selectively couple said input and output channels, said first control part being coupled to said input port and detecting a first receiving input channel which receives a sending signal first out of said input channels, said second control part being coupled to said input and output ports and controlling said switching gate part based on a time supervision of a signal presence at said input and output channels of said input and output ports, said first control part controlling said switching gate part responsive to the detection of said first receiving input channel so that all of said input channels other than said first receiving input channel are disconnected from said output channels, thereby transferring the sending signal received by said first receiving input channel to all of said output channels other than an output channel having a channel number corresponding to that of said first receiving input channel, said first control part detecting a predetermined input channel which receives a returning signal out of said input channels other than said first receiving input channel, said first control part controlling said switching gate part responsive to the detection of said predetermined input channel so that said predetermined input channel is connected to the output channel having a channel number corresponding to that of said first receiving input channel and said first receiving input channel is connected to an output channel having a channel number corresponding to that of said predetermined input channel, thereby fixing a communication path between said input and output ports, said second control part controlling said switching gate part to disconnect and release the fixed communication path when a certain logic state of the signal continues at said input and output channels of said input and output ports for a predetermined time period after the communication path is fixed, said predetermined time period being variable, said second control part having a circuit part for determining said predetermined time period depending on a characteristic of the sending signal for at least one of said first receiving input channel and the corresponding output channel.

2. A node apparatus as claimed in claim 1 in which said circuit part of said second control part determines said predetermined time period depending on a protocol of the sending signal.

3. A node apparatus as claimed in claim 1 in which said circuit part of said second control part determines said predetermined time period depending on a pattern of at least a portion of said sending signal.

4. A node apparatus as claimed in claim 1 in which said circuit part of said second control part determines said predetermined time period depending on a frequency of a preamble included in the sending signal.

5. A node apparatus as claimed in claim 1 in which said second control part comprises a communication end detecting part for detecting an end of a communication by supervising the signal presence at all of said input and output channels of said input and output ports, and a communication storage part for storing input and output channel numbers included in the fixed communication path.

6. A node apparatus as claimed in claim 5 in which said communication end detecting part detects the end of the communication when signals cease in each input channel included in the fixed communication path.

7. A node apparatus as claimed in claim 5 in which said circuit part of said second control part varies said predetermined time period by varying at least a fundamental operation clock frequency of said communication end detecting part.

* * * * *